3,346,452
5,6-LOWER ALKYLENE-PYRIMIDINES
Richard William James Carney, Murray Hill, Herbert Morton Blatter, Millburn, and George De Stevens, Summit, N.J., assignors to Ciba Corporation, New York, N.Y., a corporation of Delaware
No Drawing. Filed Aug. 19, 1963, Ser. No. 303,163
8 Claims. (Cl. 167—65)

The present invention concerns 2-R-4-N-(N,N-disubstituted amino-lower alkyl)-N-$R_1$-amino-5,6-lower alkylene-pyrimidine compounds, in which R is hydrogen or an organic radical, $R_1$ is hydrogen, an aliphatic radical or an acyl radical, lower alkylene has from three to five carbon atoms as chain members, and lower alkyl separates N,N-disubstituted amino from amino by at least two carbon atoms, and salts thereof, as well as N-oxides, salts of N-oxides, or quaternary ammonium compounds thereof.

More especially, it relates to compounds of the formula

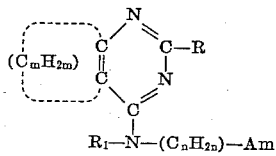

$$R_1-N-(C_nH_{2n})-Am$$

in which R and $R_1$ have the previously-given meaning, the group Am stands for N,N-disubstituted amino, the group of the formula —$(C_nH_{2n})$— is lower alkylene separating the N,N-disubstituted amino group Am from the nitrogen atom by at least two carbon atoms, and the group of the formula —$(C_mH_{2m})$— is lower alkylene having from three to five carbon atoms as chain members, or salts thereof, as well as N-oxides thereof, salts of N-oxides thereof, or quaternary ammonium compounds thereof. Also included within the scope of this invention is a process for the preparation of these compounds.

In the N,N-disubstituted amino group Am the nitrogen atom may be substituted by two individual substituents, or may be part of a ring structure together with a divalent radical. N,N-disubstituted amino groups having two individual substituents attached to the nitrogen atom, are primarily N,N-di-aliphatic substituted amino groups, in which the aliphatic substituents are, for example, lower alkyl, lower alkenyl, cycloalkyl, cycloalkyl-lower alkyl, carbocyclic aryl-lower alkyl and the like, having a total of from one to ten carbon atoms. Examples of such N,N-dialiphatic substituted amino groups are above all N,N-dilower alkyl-amino, e.g., N,N-dimethylamino, N-ethyl-N-methyl-amino, N,N-diethylamino, N,N-di-n-propyl-amino, N,N-di-isopropylamino and the like, as well as N-cycloalkyl-N-lower alkyl-amino, in which cycloalkyl has from five to seven carbon atoms, e.g. N-cyclopentyl-N-methyl-amino, N-cyclohexyl-N-methyl-amino, N-cyclohexyl-N-ethyl-amino, N-cycloheptyl-N-methyl-amino and the like, N-cycloalkyl-lower alkyl-N-lower alkyl-amino, in which cycloalkyl has from five to seven carbon atoms, e.g. N-cyclopentylmethyl-N-methyl-amino, N-cyclohexylmethyl-N-ethyl-amino, N-(2 - cyclohexylethyl)-N-methyl-amino and the like, N-lower alkyl-N-phenyl-lower alkyl-amino, e.g. N-benzyl-N-methyl-amino, N-benzyl-N-ethyl-amino, N-methyl-N-(2-phenylethyl)-amino and the like, or any other N,N-di-aliphatic substituted amino groups, for example, those in which a lower alkyl substituent is substituted by a functional group, e.g. hydroxyl, lower alkoxy, mercapto, lower alkyl-mercapto and the like, for example, N,N-di-hydroxy-lower alkyl-amino, in which hydroxy is separated from the nitrogen by at least two carbon atoms, e.g. N,N-di-(2-hydroxyethyl)-amino and the like.

N,N-disubstituted amino groups representing Am in the above formula, in which the nitrogen atom is part of a ring structure together with a divalent radical, are primarily N,N-alkylene-imino or N,N-alkylene-imino radicals in which the alkylene portion is interrupted by a heteroatom, e.g. nitrogen, oxygen, or sulfur. These N,N-disubstituted amino groups are represented by 1-N,N-alkylene-imino, in which alkylene has from four to eight carbon atoms, e.g. 1-pyrrolidino, 2-methyl-1-pyrrolidino, 1-piperidino, 2-methyl-1-piperidino, 4-methyl-1-piperidino, 1-N,N-(1,6-hexylene)-imino, 1-N,N-(1,7-heptylene)-imino, 1-N,N-(1,8-octylene)-imino and the like. N,N-alkylene-imino radicals, in which the alkylene portion is interrupted by heteroatoms, are, for example, 1-N,N-(aza-alkylene)-imino, in which alkylene has from four to six carbon atoms, and the aza-nitrogen is separated from the imino-nitrogen by at least two carbon atoms, such as 1-N,N-(N-lower alkyl-aza-alkylene)-imino, 1-N,N-(oxa-alkylene)-imino, in which alkylene has preferably four carbon atoms, and the oxa-oxygen is separated from the imino-nitrogen by two carbon atoms, or 1-N,N-(thia-alkylene)-imino, in which alkylene has preferably four carbon atoms, and the thia-sulfur is separated from the imino-nitrogen by two carbon atoms. Examples of such N,N-alkylene-imino radicals, in which the alkylene portion is interrupted by a heteroatom, are, for example, 1-piperazino, 4-lower alkyl-1-piperazino, e.g. 4-methyl-1-piperazino, 4-ethyl-1-piperazino and the like, 1-N,N-(aza-1,6-hexylene)-imino, in which the aza-nitrogen is separated from the imino-nitrogen by at least two carbon atoms, such as 1-N,N-(3-aza-1,6-hexylene)-imino, for example, 1-N,N-(3-aza-3-lower alkyl-1,6-hexylene)-imino, e.g. 1-N,N-(3-aza-3-methyl-1,6-hexylene)-imino and the like, or 1-N,N-(aza-1,7-hepytlene)-imino, in which the aza-nitrogen is separated from the imino-nitrogen by at least two carbon atoms, such as 1-N,N-(3-aza-1,7-heptylene)-imino, for example, 1-N,N-(3-aza-3-lower alkyl-1,7-heptylene)-imino, e.g. 1-N,N-(3-aza-3-methyl-1,7-heptylene)imino and the like, 1-N,N-(4-aza-1,7-heptylene)-imino, such as 1-N,N-(4-aza-4-lower alkyl-1,7-heptylene)-imino, e.g. 1-N,N-(4-aza-4-methyl-1,7-heptylene)-imino and the like, 4-morpholino, 3-methyl-4-morpholino, 4-thiamorpholino or any other equivalent N,N-alkylene-imino radical, in which alkylene is interrupted by a heteroatom.

The lower alkyl radical, separating the N,N-disubstituted amino group from amino by at least two carbon atoms and represented in the above formula by the group of the formula —$(C_nH_{2n})$—, stands for lower alkylene having from two to seven carbon atoms (i.e. the letter $n$ is an integer from two to seven, both inclusive). Preferably, it stands for lower alkylene having from two to three carbon atoms (i.e. the letter $n$ stands preferably for an integer from two to three) and separates the N,N-disubstituted amino group from the amino group by two to three carbon atoms. Such alkylene radical is preferably 1,2-ethylene, 1-methyl-1,2-ethylene, 2-methyl-1,2-ethylene or 1,3-propylene, but may also be 1,3-butylene, 2,3-butylene, 3,4-butylene, 1,4-butylene, 1,4-pentylene, 1,5-pentylene, 1,5-hexylene, 1,6-hexylene, 1,7-heptylene and the like.

The group $R_1$ substituting amino of the N,N-disubstituted amino-lower alkyl-amino radical is above all hydrogen, but may also represent an aliphatic radical, such as lower alkyl, e.g. methyl, ethyl, isopropyl and the like, or phenyl-lower alkyl, e.g. benzyl, 2-phenylethyl and the like, or an acyl radical, such as lower alkanoyl, e.g. acetyl, propionyl and the like, or benzoyl, nicotinoyl and the like.

The group R substituting the 2-position of the pyrimidine portion of the compounds of this invention is hydrogen or an organic radical; the latter is an aliphatic radical, such as lower alkyl, e.g. methyl, ethyl, n-propyl, isopropyl and the like, an aryl radical, such as monocyclic or bicyclic carbocyclic aryl, for example, phenyl, or substituted phenyl, in which one or more than one of the same or of different substituents may be attached to any position available for substitution, especially (lower alkyl)phenyl, in which lower alkyl is methyl, ethyl, n-propyl, isopropyl and the like, (lower alkoxy)-phenyl, in which lower alkoxy is methoxy, ethoxy, n-propyloxy and the like, or (halogeno)-phenyl, in which halogeno is fluoro, chloro, bromo and the like, 1-naphthyl, 2-naphthyl or substituted-1-naphthyl or 2-naphthyl, in which the substituents are especially lower alkyl, lower alkoxy halogeno, and the like, or monocyclic or bicyclic heterocyclic aryl, especially pyridyl, e.g. 2-pyridyl, 4-pyridyl and the like, thienyl, e.g. 2-thienyl, or furyl, e.g. 2-furyl and the like, or an aryl-aliphatic radical, such as monocyclic or bicyclic carbocyclic-lower alkyl, especially phenyl-lower alkyl, e.g. benzyl, 1-phenylethyl, 2-phenylethyl and the like, or substituted-phenyl-lower alkyl, in which the substituents are especially lower alkyl, lower alkoxy, halogeno and the like, or any other suitable organic radical.

The lower alkylene radical connecting the 5-position of the pyrimidine portion with its 6-position, and represented in the above formula by the group of the formula $—(C_mH_{2m})—$, has from three to five carbon atoms, and is primarily 1,4-butylene, as well as 1,3-propylene or 1,5-pentylene. Its carbon atoms may contain additional substituents, such as lower alkyl, particularly methyl and the like; substituted alkylene radicals are for example, 2-methyl-1,3-propylene, 1-methyl-1,4-butylene, 2-methyl-1,4-butylene, 2,3-dimethyl-1,4-butylene, 2-ethyl-1,4-butylene, 2-methyl-1,5-pentylene and the like.

Salts of the compounds of this invention are acid addition salts, such as pharmaceutically acceptable acid addition salts with inorganic acids, e.g. hydrochloric, hydrobromic, sulfuric, phosphoric acids and the like, or organic acids, such as organic carboxylic acids, e.g. acetic, propionic, pivalic, glycolic, lactic, malonic, succinic, maleic, hydroxy-maleic, malic, tartaric, citric, benzoic, salicylic, 2-acetoxybenzoic, nicotinic, isonicotinic acid and the like, or organic sulfonic acids, e.g. methane sulfonic, ethane sulfonic, ethane 1,2-disulfonic, 2-hydroxy-ethane sulfonic, p-toluene sulfonic, naphthalene 2-sulfonic acid and the like. Other acid addition salts may be useful as intermediates, for example, in the preparation of pharmaceutically acceptable acid addition salts or in the purification of the free compounds, as well as for identification or characterization purposes. Useful salts for the latter are, for example, those with acidic organic nitro compounds, e.g. picric, picrolonic, flavianic acid and the like, or metal complex acids, e.g. phosphotungstic, phosphomolybdic, chloroplatinic, Reinecke acid and the like. Mono- or poly- salts may be formed depending on the condition used for the salt formation and the number of salt-forming groups.

Also included within the scope of the present invention are the N-oxides of the aforementioned compounds, as well as the acid addition salts, for example, the pharmaceutically acceptable acid addition salts, of such N-oxides, for example, those with the above-mentioned acids.

Quaternary ammonium compounds of the compounds of this invention are those formed with reactive esters of alcohols and strong inorganic or organic acids, particularly those with lower aliphatic hydrocarbon halides, sulfates or sulfonates, such as lower alkyl halides, e.g. methyl, ethyl, n-propyl or isopropyl chloride, bromide or iodide and the like, di-lower alkyl sulfates, e.g. dimethyl sulfate, diethyl sulfate and the like, lower alkyl lower alkane sulfonates, e.g. ethyl or methyl methane sulfonate, or ethane sulfonate and the like, or lower alkyl lower hydroxyalkane sulfonates, e.g. methyl 2-hydroxy-ethane sulfonate and the like, or lower alkyl monocyclic carbocyclic aryl sulfonates, e.g. methyl p-toluene sulfonate, ethyl p-toluene sulfonate and the like, as well as those with carbocyclic aryl-aliphatic halides, such as phenyl-lower alkyl halides, e.g. benzyl, 1-phenylethyl or 2-phenyl-ethyl chloride, bromide or iodide and the like. Also included as quaternary ammonium compounds are the corresponding quaternary ammonium hydroxides, and the quaternary ammonium salts with other acids, particularly those with the organic carboxylic acids mentioned hereinabove.

The compounds of this invention have analgesic effects, and are, therefore, useful as analgesic agents to raise the threshold of pain, and thus alleviate pain or the symptoms thereof, such as acute pains caused by surgery, accidents and the like, pain caused by spastic condition, e.g. headaches and the like, or chronic pains connected with arthritic conditions and the like.

Particularly useful as analgesic agents are the compounds of the formula

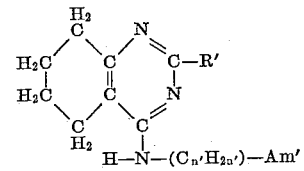

in which the group Am' is N,N-lower alkyl-amino, N,N-alkylene-imino, in which alkylene has from four to seven carbon atoms, 4-lower alkyl-piperazino or 4-morpholino, the group of the formula $—(C_{n'}H_{2n'})—$ is lower alkylene having from two to three carbon atoms and separating the group Am' from the amino group by two to three carbon atoms, and R' is hydrogen, lower alkyl, phenyl, (lower alkyl)-phenyl, (lower alkoxy)-phenyl or (halogeno)-phenyl, or acid addition salts, such as pharmaceutically acceptable acid addition salts, thereof.

The new compounds of this invention may be used in the form of compositions for enteral, e.g. oral, or parenteral administration, which consists essentially of a pharmacologically effective dose of one of the new compounds in admixture with a pharmaceutical organic or inorganic, solid or liquid vehicle suitable. For making up the preparations, there may be used substances, which do not react with the new compounds, such as water, gelatine, lactose, starches, lactic acid, stearic acid, magnesium stearate, stearyl alcohol, talc, acacia, vegetable oils, benzyl alcohol, gums, propylene glycol, polyalkylene glycols, or any other suitable carrier material. The preparations may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying, coloring, flavoring agents and the like, salts for varying the osmotic pressure, buffers, etc. They may also contain, in combination, other useful substances, for example, compounds having other pharmacological properties.

The compounds of this invention are prepared according to known methods, for example, by converting in a 2-R-4-X-5,6-lower alkylene-pyrimidine compound, in which lower alkylene and R have the previously-given meaning, particularly in a compound of the formula

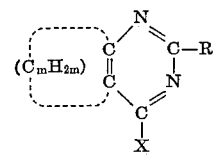

in which R and the group of the formula $—(C_mH_{2m})—$ have the previously-given meaning, and X is a group capable of being converted into an N-(N,N-disubstituted amino-lower alkyl)-N-$R_1$-amino group, in which lower alkyl separates the N,N-disubstituted amino group from amino by at least two carbon atoms, particularly into a group of the formula

in which Am, $R_1$ and the group of the formula

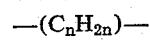

have the previously-given meaning, or a salt of such compound, the group X into the desired N-(N,N-disubstituted amino-lower alkyl)-N-R₁-amino group, in which R₁ has the previously-given meaning, and lower alkyl separates the N,N-disubstituted amino group from amino by at least two carbon atoms, particularly into the group of the formula

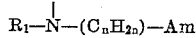

in which Am, R₁ and the group of the formula

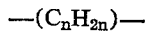

have the previously-given meaning, and, if desired, converting a resulting salt into the free compound or into another salt, and/or, if desired, converting a resulting compound into an N-oxide or into a quaternary ammonium compound, and/or, if desired, converting a resulting compound or an N-oxide thereof into a salt thereof, and/or, if desired, converting a resulting quaternary ammonium compound into another quaternary ammonium compound, and/or, if desired, replacing in a resulting compound, in which the amino portion of the N-(N,N-disubstituted amino-lower alkyl)-amino substituent has a hydrogen, such hydrogen by an aliphatic radical or into an acyl radical, and/or, if desired, replacing in a resulting compound, in which amino of the N-(N,N-disubstituted amino-lower alkyl)-amino group is substituted by acyl, such acyl by hydrogen or an aliphatic radical, and/or, if desired, separating a resulting mixture of isomers into the single isomers.

In the above starting material, a preferred substituent X capable of being converted into the desired N-(N,N-disubstituted amino-lower alkyl)-N-R₁-amino group is above all a reactive esterified hydroxyl group, especially halogeno (representing hydroxyl esterified with a hydrohalic acid) having preferably an atomic weight greater than 19, e.g. chloro, bromo and the like, as well as any other hydroxyl group esterified with a strong inorganic or organic acid, such as a strong organic sulfonic acid, e.g. p-toluene sulfonic acid and the like.

The conversion of a reactive esterified hydroxyl group, especially of halogeno, into the desired N-(N,N-amino-lower alkyl)-N-R₁-amino group is carried out according to known method, for example, by reacting the above 2-R-4-X-5,6-lower alkylene-pyrimidine starting material with an N-(N,N-disubstituted amino-lower alkyl)-amine, in which R₁ has the previously-given meaning, and lower alkyl separates N,N-disubstituted amino from amino by at least two carbon atoms, or a salt thereof, particularly with a compound of the formula R₁—NH—(CₙH₂ₙ)—Am in which Am, R₁ and the group of the formula

—(CₙH₂ₙ)— have the previously-given meaning, or a salt thereof.

A salt of an N-(N,N-disubstituted amino-lower alkyl)-N-R₁-amine reagent is, for example, an acid addition salt; it may also be a metal salt, such as an alkali metal, e.g. sodium, potassium and the like, salt, particularly, if the amine portion is substituted by an acyl group. These salts are prepared according to known methods, the latter by reacting the N-acylated compound with a metal salt forming reagent, e.g. sodium amide, sodium hydride and the like. The reaction is preferably performed at an elevated temperature; if desired, an excess of the N-(N,N-disubstituted-amino-lower alkyl)-amine may be employed to neutralize the generated acid. The reaction is carried out in the absence or in the presence of a diluent, e.g. ethanol and the like, or a mixture of solvents, if necessary, in a closed vessel and/or in the atmosphere of an inert gas, e.g. nitrogen.

The above 2-R-4-reactive esterified hydroxy-5,6-lower alkylene-pyrimidine starting materials are new and are intended to be included within the scope of the invention.

These intermediates are especially represented by the compounds of the formula

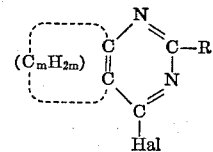

in which R and the group of the formula —(CₘH₂ₘ)— have the previously-given meaning and Hal stands for halogeno having preferably an atomic weight greater than 19, and the acid addition salts of these compounds; particularly useful as intermediates in the above procedure are the compounds of the formula

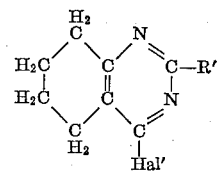

in which R' has the previously-given meaning, and Hal' is chloro or bromo, and the acid addition salts of these compounds.

The above starting materials are prepared according to known methods; for example, the 2-R-4-halogeno-5,6-lower alkylene-pyrimidine starting material may be obtained from the corresponding 2-R-5,6-lower alkylene-1,4-dihydro-pyrimidin-4-one compound or a tautomer thereof, such as a 2-R-4-hydroxy-5,6-lower alkylene-pyrimidine compound and the like, by treating it with a suitable halogenating reagent capable of replacing an oxo group or a hydroxyl group by halogeno, for example, with a phosphorus oxyhalide, e.g. phosphorus oxychloride and the like, a phosphorus halide, e.g. phosphorus pentachloride, phosphorus tribromide and the like, a thionyl halide, e.g. thionyl chloride and the like, or any other equivalent reagent, preferably at an elevated temperature, and, if necessary, in the presence of a suitable diluent. Other 2-R-4-reactive esterified hydroxy-5,6-lower alkylene-pyrimidine starting materials are prepared from these intermediates according to known esterification procedures. The intermediates used for the preparation of the above starting materials are known or are prepared according to known methods.

The above starting materials may also be prepared, for example, by treating a 2-R-5,6-lower alkylene-1,4-dihydro-pyrimidin-4-thione or a tautomer thereof, such as the 2-R-4-mercapto-5,6-lower alkylene-pyrimidine compound, or the corresponding 2-R-4-etherified mercapto-5,6-lower alkylene-pyrimidine compound, in which the etherified mercapto group is primarily lower alkyl-mercapto, e.g. methylmercapto and the like, with a reagent capable of replacing a thiono group or a mercapto group by halogeno, for example, a phosphorus oxyhalide, e.g. phosphorus oxychloride and the like, or any other suitable halogenating agent, such as one of those previously-mentioned, preferably at an elevated temperature.

The above 2-R-5,6-lower alkylene - 1,4 - dihydro-pyrimidin-4-thione intermediates or its tautomers are new and are intended to be included within the scope of this invention. They are represented by the compounds of the formula

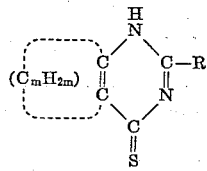

in which R and the group of the formula $-(C_mH_{2m})-$ have the previously-given meaning, or the tautomers thereof, particularly by the compounds of the formula

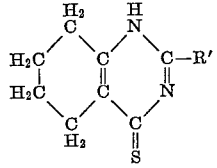

in which R' has the previously-given meaning, or the tautomers thereof.

The above intermediates are prepared, for example, by reacting a 2-R-5,6-lower alkylene-4H-1,3-oxazin-4-thione compound or a tautomer thereof with ammonia or an ammonia-furnishing reagent. This reaction is carried out by treating a solution of the 4H-1,3-oxazine compound in a suitable diluent, such as methanol and the like, with gaseous ammonia or any other suitable reagent furnishing ammonia. They are also prepared by reacting a 2-R-5,6-lower alkylene - 1,4 - dihydro-pyrimidin-4-one compound or a tautomer thereof, such as a 2-R-4-hydroxy-5,6-lower alkylene-pyrimidine, with a reagent capable of converting an oxo group, into a thiono group; suitable reagents are, for example, phosphorus pentasulfide and the like.

Another group X in a 2-R-4-X-5,6-lower alkylene-pyrimidine starting material capable of being converted into the desired N-(N,N-disubstituted-amino-lower alkyl)-N-$R_1$-amino group is an $R_1$-amino group as represented by the formula

in which $R_1$ has the previously-given meaning. Conversion of such group into N-(N,N-disubstituted amino-lower alkyl)-N-$R_1$-amino is carried out according to known methods; for example, a 2-R-4-($R_1$-amino)-5,6-lower alkylene-pyrimidine starting material or a salt thereof may be treated with a reactive ester of an N,N-disubstituted amino-lower alkanol, in which N,N-disubstituted amino is separated from the hydroxyl group by at least two carbon atoms, particularly with a compound of the formula $X_o-(C_nH_{2n})-Am$, in which Am and the group of the formula $-(C_nH_{2n})-$, the latter separating Am from $X_o$ by at least two carbon atoms have the previously-given meaning, and $X_o$ is a reactive esterified hydroxyl group, or a salt of such compound. The reactive esterified hydroxyl group represented by $X_o$ is particularly halogeno (i.e. hydroxyl esterified by a hydrohalic acid), having an atomic weight greater than 19, e.g. chloro, bromo and the like, as well as an organic sulfonyloxy group, e.g. 4-methylphenyl-sulfonyloxy and the like, or any equivalent reactive esterified hydroxyl group. The above reaction is carried out according to known methods; preferably, it is performed at an elevated temperature, and, if necessary, in the presence of a diluent and/or a base (which may also be furnished by an excess of the basic 2-R-4-($R_1$-amino)-5,6-lower alkylene-pyrimidine starting material) to neutralize any generated acid, or to liberate the basic reagent from an acid addition salt, and/or in a closed vessel, and/or in the atmosphere of an inert gas, e.g. nitrogen.

The starting material used in the above modification of the process of this invention is known or may be prepared according to known methods, for example, by converting in a 2-R-4-X-5,6-lower alkylene-pyrimidine compound, in which X is halogeno, the group X into the amino group, for example, by treatment with ammonia or an ammonia-furnishing reagent, or with an $R_1$-amine, if necessary, a salt thereof.

Another group X in a 2-R-4-X-5,6-lower alkylene-pyrimidine starting material capable of being converted into the desired N-(N,N-disubstituted amino-lower alkyl)-N-$R_1$-amino group is an N-(reactive esterified hydroxy-lower alkyl)-N-$R_1$-amino group, in which $R_1$ has the previously-given meaning, and lower alkyl separates the reactive esterified hydroxyl group from the amino group by at least two carbon atoms, particularly a group of the formula

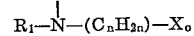

in which $X_o$, $R_1$ and the group of the formula $$-(C_nH_{2n})-$$

separating $X_o$ from the nitrogen atom by at least two carbon atoms, have the previously-given meaning. Conversion of such group into the desired N-(N,N-disubstituted amino-lower alkyl)-N-$R_1$-amino group is carried out according to known methods, for example, by reacting the starting material or a salt thereof with an N,N-substituted amine, particularly with a compound of the formula H—Am, in which Am has the previously-given meaning. The above reaction is carried out according to the one previously-described involving the reaction of a 2-R-4-($R_1$-amino)-5,6-lower alkylene-pyrimidine compound with a reactive esterified ester of an N,N-disubstituted amino-lower alkanol.

The 2-R-4-N-(reactive esterified hydroxy-lower alkyl)-N-$R_1$-amino-5,6-lower alkylene-pyrimidine starting material may be prepared according to known methods. Thus, a 2-R-4-($R_1$-amino)-5,6-lower alkylene-pyrimidine compound or a salt thereof may be treated with a reactive ester of a reactive esterified hydroxy-lower alkanol, in which the two reactive esterified hydroxyl groups are separated by at least two carbon atoms, preferably with a compound of the formula $X_o'-(C_nH_{2n})-X_o$, in which $X_o$ and the group of the formula $-(C_nH_{2n})-$ have the previously-given meaning, and $X_o'$ is a reactive esterified hydroxyl group, especially halogeno; such reagent is, for example, a halogeno-lower alkyl halide, in which the two halogeno groups, having preferably an atomic weight greater than 19, are different and are separated by at least two carbon atoms. A 2-R-4-($R_1$-amino)-5,6-lower alkylene-pyrimidine compound may also be reacted with a reactive esterified hydroxy-lower alkanol, in which the reactive esterified hydroxyl group represents primarily halogeno and is separated from the hydroxyl group by at least two carbon atoms, particularly with a compound of the formula $X_o'-(C_nH_{2n})-OH$, in which $X_o'$ and the group of the formula $-(C_nH_{2n})-$ have the previously-given meaning, and in a resulting 2-R-4-N-(hydroxy-lower alkyl)-N-$R_1$-amino-5,6-lower alkylene-pyrimidine compound, in which $R_1$ has the previously-given meaning, and lower alkyl separates the hydroxyl group from the amino group by at least two carbon atoms, the hydroxyl group may then be converted into a reactive esterified hydroxyl group (for example, into halogeno by treatment with a suitable halogenating reagent, e.g. thionyl chloride, phosphorus tribromide and the like, or into an organic sulfonyloxy group by treatment with an organic sulfonic acid halide, e.g. p-toluene sulfonic acid chloride and the like).

The group X in the above 2-R-4-X-5,6-lower alkylene-pyrimidine starting material may also represent an N-(N,N-disubstituted amino-lower alkanoyl)-N-$R_1$-amino group or an N-(N,N-disubstituted amino-lower thioalkanoyl)-N-$R_1$-amino group, in which $R_1$ has the previously-given meaning, and N,N-disubstituted amino is separated from amino by at least two carbon atoms, particularly the group of the formula

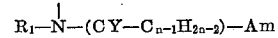

in which Am and $R_1$ have the previously-given meaning Y stands for oxo of the formula $=O$ or thiono of the formula $=S$ and the portion of the formula

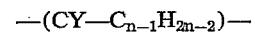

separates Am from the amino group by at least two carbon atoms. 2-R-4-N-(N,N-disubstituted amino-lower alkanoyl)-N-R₁-amino-5,6-lower alkylene-pyrimidine starting materials and 2-R-4-N-(N,N-disubstituted amino-lower thioalkanoyl)-N-R₁-amino-5,6-lower alkylene-pyrimidine starting materials are converted into the desired compounds of this invention according to known methods capable of replacing oxo in a carbonyl group or thiono in a thiocarbonyl group by two hydrogen atoms.

Replacement of oxo by two hydrogen atoms is carried out by reduction and is preferably achieved by treating the appropriate starting material with an aluminum hydride, particularly an alkali metal aluminum hydride, e.g. lithium aluminum hydride, sodium aluminum hydride and the like, or an alkaline earth metal aluminum hydride, e.g. magnesium aluminum hydride and the like, or aluminum hydride. If necessary, activators, such as, for example, aluminum chloride, may be used together with the hydride reducing reagent. The reduction with these reagents is preferably performed in the presence of an inert solvent, particularly an ether, such as a di-lower alkyl ether, e.g. diethyl ether, dipropyl ether and the like, a cyclic ether, e.g. tetrahydrofuran, p-dioxane and the like, or any other suitable solvent, and preferably at an elevated temperature. Conversion of the carbonyl portion of an amide grouping may also be achieved by treating the appropriate starting material with hydrogen in the presence of certain catalysts such as a copper-chromium catalyst and the like, by electrolytic reduction or any other suitable method.

Replacement of sulfur in a thiocarbonyl group by two hydrogens may be carried out by desulfurization according to known methods, for example, by treatment with a freshly prepared hydrogenation catalyst, such as Raney nickel, in an alcoholic solvent, e.g. methanol, ethanol and the like, if desired, in the presence of hydrogen, by electrolytic reduction and the like.

The starting materials used in the above modification of the procedure of this invention are prepared, for example, by reacting a 2-R-4-(R₁-amino)-5,6-lower alkylene-pyrimidine compound, in which R and R₁ have the previously-given meaning, with an N,N-disubstituted amino-lower alkanoic acid halide, e.g. chloride, bromide and the like, in which the N,N-disubstituted amino group is separated from the halide portion by at least two carbon atoms; this reaction may be carried out in the presence of a liquid organic base, e.g. pyridine and the like, which may also serve as the diluent, and/or of an inert solvent, e.g. benzene, toluene and the like, either by using an excess of the basic starting material or an additional base, e.g. potassium carbonate and the like, to neutralize any generated acid.

Furthermore, a 2-R-4-(R₁-amino)-5,6-lower alkylene-pyrimidine compound, in which R and R₁ have the previously-given meaning, may be reacted with a reactive esterified hydroxy-lower alkanoic acid halide, such as a halogeno-lower alkanoic acid chloride, in which the reactive esterified hydroxyl group, such as halogeno, is separated from the halide portion, such as the chloride portion, by at least two carbon atoms, and a resulting 4-N-(reactive esterified hydroxy-lower alkanoyl)-N-R₁-amino-5,6-lower alkylene-pyrimidine compound is then reacted with an N,N-disubstituted amine to yield the desired starting material. In a resulting 2-R-4-N-(N,N-disubstituted amino-lower alkanoyl)-N-R₁-amino-5,6-lower-alkylene-pyrimidine starting material, in which R and R₁ have the previously-given meaning, and in which N,N-disubstituted amino is separated from amino by at least two carbon atoms, the carbonyl portion of the amide grouping may be replaced by thiocarbonyl, for example, by treatment with a reagent capable of replacing oxo by thiono, e.g. phosphorus pentasulfide and the like, as previously-described.

The group X in a 2-R-4-X-5,6-lower alkylene-pyrimidine starting material may also represent an N-(x-N,N-disubstituted amino-x-oxo - lower alkyl) - N - R₁ - amino group or an N-(x-N,N-disubstituted amino-x-thiono-lower alkyl)-N-R₁-amino group, in which R₁ has the previously-given meaning, and N,N-disubstituted amino is separated from amino by at least two carbon atoms and substitutes the carbon atom carrying the oxo group and the thiono group, respectively, particularly the group of the formula

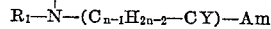

in which R₁, Y and Am have the previously-given meaning, and the portion of the formula

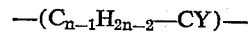

separates Am from amino by at least two carbon atoms. In the 2-R-4-N-(x-N,N-disubstituted amino-x-oxo-lower alkyl)-N-R₁-amino-5,6 - lower alkylene - pyrimidine and 2-R-4-N-(x-N,N-disubstituted amino-x - thiono - lower alkyl)-N-R₁-amino-5,6-lower alkylene - pyrimidine starting materials the oxo group or the thiono group are replaced by two hydrogens according to known methods, such as those previously described.

The starting materials used in the above modification of the process for the manufacture of the compounds of this invention are prepared according to known methods. For example, a 2-R-4-(R₁-amino)-5,6-lower alkylene-pyrimidine compound, in which R and R₁ have the previously-given meaning, or a salt thereof may be reacted with a reactive esterified hydroxy-lower alkanoic acid or a functional acid derivative thereof, particularly a compound of the formula X₀—C$_{n-1}$H$_{2n-2}$—COOH, in which X₀ has the previously-given meaning (being particularly halogeno having an atomic weight greater than 19, e.g. chloro, bromo and the like), or a functional acid derivative thereof. A particularly suitable functional acid derivative of the above carboxylic acid is the reactive esterified hydroxy-lower alkanoic acid N,N-disubstituted amide, particularly a compound of the formula

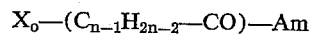

in which X₀ and Am have the previously-given meaning. Other functional acid derivatives of the above reactive esterified hydroxy-lower alkanoic acid are its esters, particularly its lower alkyl, e.g. methyl, ethyl and the like, esters, or any other derivative, for example, a reactive esterified hydroxy-lower alkano-nitrile and the like. The reaction of a 2-R-4-(R₁-amino)-5,6-lower alkylene-pyrimidine compound with the reactive esterified hydroxy-lower alkanoic acid or a functional acid derivative thereof is carried out in the presence of an appropriate diluent, for example, a liquid organic base, e.g. pyridine and the like, to neutralize any generated acid, and if necessary, at an elevated temperature.

In a resulting intermediate the free carboxyl group or a functionally converted carboxyl group other than an N,N-disubstituted amide grouping is then converted into the latter according to known methods. Thus, a resulting intermediate having a free carboxyl group is converted into its carboxylic acid halide, e.g. chloride and the like (for example, by treatment with a thionyl halide, e.g. thionyl chloride and the like), which is then reacted with an N,N-disubstituted amine, particularly a compound of the formula H—Am, in which Am has the previously-given meaning, to yield the desired starting material. An ester group in a resulting compound, such as a carbo-lower alkoxy group, is converted into an N,N-disubstituted amide grouping by treatment with an N,N-disubstituted amine, particularly a compound of the formula H—Am, in which Am has the previously-given meaning, whereas a cyano group in a resulting nitrile intermediate may first be hydrolyzed into the free carboxyl group or alcoholyzed into an esterified carboxyl group, and the resulting carboxylic acid compound or an ester thereof is converted into the desired 2-R-4-N-(x-N,N-disubstituted amino-x-oxo-lower alkyl)-N-R₁ - amino - 5,6-lower alkylene-pyrimidine starting material according to any of the previously-described methods. In the latter, the oxo group may be replaced by thiono, for example, by treating it with a suitable reagent, e.g. phosphorus pentasulfide and the like, as previously described.

A resulting acid addition salt of a compound prepared according to the procedure of this invention may be converted into the free compound, for example, by reacting it with an alkaline reagent, such as a metal hydroxide, e.g. lithium hydroxide, sodium hydroxide, potassium hydroxide, calcium hydroxide and the like, a metal carbonate, e.g. sodium, potassium or calcium carbonate or hydrogen carbonate and the like, ammonia and the like, or by treatment with a suitable hydroxyl ion exchange resin.

A resulting acid addition salt of a compound prepared according to the procedure of this invention may also be converted into another salt; for example, a salt with an inorganic acid may be reacted with a suitable metal, e.g. sodium, silver, barium and the like, salt of an acid, in the presence of a diluent, in which a resulting inorganic compound is insoluble and is thus removed from the reaction. Conversion of an acid addition salt into another acid addition salt may also be achieved by treatment with an anion exchange preparation.

A free compound resulting from the process of this invention may be converted into an acid addition salt thereof by reacting it or a solution thereof in a suitable solvent or solvent mixture with an acid or a solution thereof, or with an anion exchange preparation, and isolating the desired salt. A salt may be obtained in the form of a hydrate thereof or may include solvent of crystallization.

N-oxides of the compounds of this invention may be prepared, for example, by treating the free compound with a suitable N-oxidation reagent, such as hydrogen peroxide, ozone or a peracid, e.g. peracetic, perbenzoic, monoperphthalic, persulfuric acid and the like, in an inert solvent. An N-oxide may be converted into a salt thereof according to the above procedure.

The quaternary ammonium derivatives of the compounds of this invention may be obtained, for example, by reacting the base with a reactive ester of an alcohol and a strong acid, such as, for example, with one of the lower alkyl halides, di-lower alkyl-sulfates, lower alkyl sulfonates, phenyl-lower alkyl halides described above. The quaternizing reaction may be performed in the absence or presence of a solvent, while cooling or at an elevated temperature, if necessary, in a closed vessel and/or in the atmosphere of an inert gas, e.g., nitrogen and the like.

Quaternary ammonium compounds may be converted into other quaternary ammonium compounds, such as quaternary ammonium hydroxides, for example, by reacting a quaternary ammonium halide with silver oxide, or a quaternary ammonium sulfate with barium hydroxide, by treating a quaternary ammonium salt with a hydroxyl ion exchange preparation, by electrodialysis or any other suitable method. A quaternary ammonium hydroxide may be converted into a quaternary ammonium salt by reacting the former with a suitable acid. A quaternary ammonium salt may be converted directly into another quaternary ammonium salt; for example, a quaternary ammonium iodide may be reacted with a freshly prepared silver chloride or with hydrochloric acid in anhydrous methanol to yield the desired quaternary ammonium chloride, or a quarternary ammonium salt may be treated with an anion exchange resin and thus be converted into another quaternary ammonium salt. A quaternary ammonium compound may be obtained in the form of a hydrate thereof or may contain solvent of crystallization.

A mixture of resulting isometric compounds may be separated into the single isomers. For example, racemates may be resolved into the optically active d- and l-forms according to known resolution procedures, for example, by forming a salt of the free racemic compound with one of the optically active forms of an acid containing an asymmetric carbon atoms. Especially useful as optically active forms of salt-forming acids having an asymmetric carbon atom are D-tartaric (l-tartaric) and L-tartaric (d-tartaric) acid, as well as the optically active forms of malic, mandelic, 10-camphor sulfonic, quinic acid and the like. From a resulting salt, the free and optically active compound may be obtained according to the method described above, and a free and optically active base may be converted into its acid addition salt, N-oxide, salt of an N-oxide or quaternary ammonium compound according to the procedures described above.

The invention also comprises any modification of the process, wherein a compound formed as an intermediate at any stage of the process, is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

A mixture of 2.0 g. of 4-chloro-2-phenyl-5,6,7,8-tetrahydro-quinazoline and 3.2 g. of N,N-dimethyl-ethylenediamine is refluxed for two hours; after cooling, it is poured into water and allowed to stand. The solid 4-N-(2 - N,N - dimethylaminoethyl)-amino-2-phenyl-5,6,7,8-tetrahydro-quinazoline of the formula

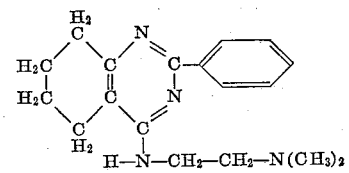

is filtered off and crystallized from acetonitrile, M.P. 87–90°, yield: 1.9 g. (79 percent of theory).

A solution of 0.5 g. of 4-N-(2-N,N-dimethylaminoethyl) - amino-2-phenyl-5,6,7,8-tetrahydro-quinazoline in a small amount of ethanol is treated with a saturated solution of hydrogen chloride in ethanol and then diluted with diethyl ether to yield the 4-N-(2-N,N-dimethylaminoethyl) - amino-2-phenyl-5,6,7,8-tetrahydro-quinazoline dihydrochloride. Its picrate is prepared by substituting picric acid for the hydrogen chloride.

The starting material used in the above procedure is prepared as follows: A solution of 107 g. of N-benzoyl-isothiocyanate (prepared by reacting benzoyl chloride with lead thiocyanate according to the procedure described by Dixon et al., J. Chem. Soc., 93, 692 (1908)) in 150 ml. of chloroform is cooled to 5° and is then treated with 55.0 g. of 1-morpholino-cyclohexene in 45 ml. of chloroform; the solution is added over a period of one hour and while cooling and maintaining an atmosphere of nitrogen. After removing the ice-bath, the reaction mixture is refluxed for thirty minutes, and is then allowed to stand overnight. The solid 2-phenyl-5,6,7,8-tetrahydro - 4H - 1,3-benzoxazin-4-thione is filtered off, washed with diethyl ether and methanol and recrystallized from N,N-dimethylformamide to yield the pure product in red needles, M.P. 197–199°; yield: 3.8 g. (47.5 percent of theory).

Ammonia gas is bubbled through a solution of 4.0 g. of 2 - phenyl - 5,6,7,8 - tetrahydro - 4H - 1,3-benzoxazin-4-thione in 100 ml. of methanol. After one hour, the reaction is interrupted, the solvent is removed, and the white crystalline 2 - phenyl - 1,4,5,6,7,8 - hexahydro-quinazolin-4-thione of the formula

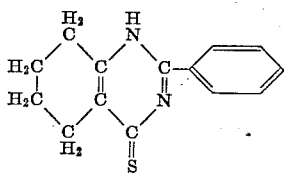

which may also be present in any of its tautomeric forms, such as the 2-phenyl-1,2,5,6,7,8-hexahydro-quinazolin-4-thione or the 4 - mercapto-2-phenyl-5,6,7,8-tetrahydro-quinazoline, is crystallized from ethanol, M.P. 199–201°; yield: 3.4 g. (or 86 percent of theory).

A mixture of 1.0 g. of 2-phenyl-1,4,5,6,7,8-hexahydro-quinazolin-4-thione and 10 ml. of phosphorus oxychloride is refluxed for one hour. The solution is cooled and poured into ice; the aqueous mixture is extracted three times with chloroform. The combined extracts are dried by treatment with anhydrous magnesium sulfate and are evaporated to dryness under reduced pressure. The desired 4 - chloro - 2 - phenyl-5,6,7,8-tetrahydro-quinazoline of the formula

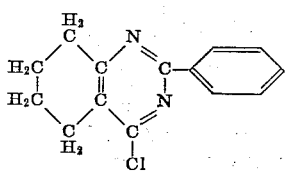

is obtained as an oil which crystallizes from ethanol, M.P. 105–106°; yield: 0.72 g. (67 percent of theory).

*Example 2*

A mixture of 2.0 g. of 4-chloro-2-phenyl-5,6,7,8-tetrahydro-quinazoline and 10 ml. of 4-(2-aminoethyl)-morpholine is refluxed for two hours. After cooling, it is poured into water and the aqueous mixture is allowed to stand whereupon a precipitate is formed. The latter is filtered off to yield the 4-N-[2-(4-morpholino)-ethyl]-amino-2-phenyl-5,6,7,8-tetrahydro-quinazoline of the formula

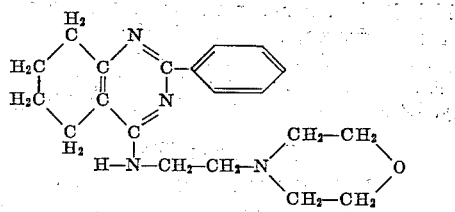

which melts at 109–110° after crystallization from acetonitrile, yield: 2.4 g. (87 percent of theory).

The starting material used in the above procedure is also prepared as follows: A mixture of 1.0 g. of 4-hydroxy - 2 - phenyl - 5,6,7,8 - tetrahydro-quinazoline (prepared according to the procedure described by Hunig et al., Ber. 95, 937 (1962) or a tautomer thereof, such as the 2 - phenyl - 1,2,5,6,7,8 - hexahydro-quinazolin - 4 - one or the 2 - phenyl - 1,4,5,6,7,8 - hexahydro - quinazolin-4-one, and 15 ml. of phosphorus oxychloride is refluxed for one hour. The excess of phosphorus oxychloride is removed under reduced pressure, and the residue is crystallized from ethanol to yield the desired 4-chloro-2-phenyl - 5,6,7,8 - tetrahydro-quinazoline, which melts at 105–108° (yield: 0.7 g. or 65 percent of theory), and is identical with the product obtained according to the procedure described in Example 1.

*Example 3*

A mixture of 0.52 g. of 4-chloro-5,6,7,8-tetrahydro-quinazoline and 5 ml. of N,N-dimethyl-ethylenediamine is refluxed for three hours. The excess of N,N-dimethyl-ethylenediamine is evaporated under reduced pressure, and the residue is taken up in a saturated solution of potassium carbonate. The aqueous mixture is extracted with methylene chloride; the organic extracts are separated, dried over sodium sulfate and evaporated. The resulting oil is extracted with pentane and the pentane solution is concentrated, whereupon the desired 4-N-(2-N,N-dimethylaminoethyl) - amino - 5,6,7,8 - tetrahydro-quinazoline of the formula

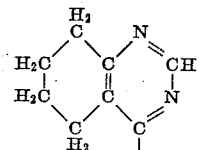

precipitates; it is filtered off and recrystallized twice from pentane, M.P. 98–101°.

The starting material used in the above procedure is prepared as follows: A mixture of 2.0 g. of 1,2,5,6,7,8-hexahydro-quinazolin-4-one (prepared according to the procedure described by Baker et al., J. Org. Chem., vol. 18, p. 133 (1953)) and 8 ml. of phosphorus oxychloride is refluxed for thirty minutes. The excess of phosphorus oxychloride is evaporated under reduced pressure, and the residue is treated with a mixture of water and ice. The precipitate is filtered off and dissolved in diethyl ether; the organic solution is dried over sodium sulfate and evaporated to yield 0.52 g. of the 4-chloro-5,6,7,8-tetrahydro-quinazoline of the formula

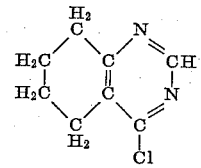

which melts at 84–87°, and is converted into its hydrobromide by treatment of a diethyl ether solution thereof with a saturated solution of hydrogen bromide in isopropanol; the 4 - chloro - 5,6,7,8 - tetrahydro-quinazoline hydrobromide melts at 210–213° after recrystallization from a mixture of methanol and diethyl ether.

Other compounds, which are prepared according to the above procedure, are for example, 2-(4-chloro-phenyl)-4-N-(2-N,N-diethylaminoethyl)-amino-5,6,7,8-tetrahydro-quinazoline, 2-(3-methyl-phenyl)-4-N-[2-(1-pyrrolidino)-ethyl]-amino-5,6,7,8-tetrahydro-quinazoline, 2-(3,4-dimethoxy-phenyl)-4-N-[2-methyl-2-(1-piperidino)-ethyl]-amino-5,6,7,8-tetrahydro-quinazoline, 2-(4-bromo-phenyl)-6-methyl-4-N-[3-(4-methyl-1-piperazino)-propyl]-amino-5,6,7,8-tetrahydro-quinazoline, 4-N-[2-(N-ethyl-N-methyl-amino)-ethyl]-amino-2-(3-pyridyl)5,6,7,8-tetrahydro-quinazoline, 4-N-[2-(N-cyclopentyl-N-methyl-amino)-ethyl]-amino-2-(2-thienyl)-5,6,7,8-tetrahydro-quinazoline, 2-benzyl-4-{2-[N-methyl-N-(2-phenylethyl)-amino]-ethyl}-5,6,7,8-tetrahydro-quinazoline, 4-N-(2-N,N-dimethylaminoethyl)-2-phenyl-5,6-(1,3-propylene)-pyrimidine, 5,6-(1,5-pentylene)-2-phenyl-4-N-[2-(4-thiamorpholino]-pyrimidine, 4-N-(2-N,N-dimethylaminoethyl)-2-methyl-5,6,7,8-tetrahydro-quinazoline, 2-isopropyl-4-N-[2-(4-morpholino)-ethyl]-5,6,7,8-tetrahydro-quinazoline.

Upon treatment with a suitable acylating reagent, e.g. acetyl chloride, acetic acid anhydride and the like, the above compounds, in which $R_1$ is hydrogen, may be converted into compounds, in which R is an acyl group, e.g. acetyl; thus, upon treatment of 4-N-(2-N,N-dimethylaminoethyl) - amino - 2 - phenyl - 5,6,7,8 - tetrahydro-quinazoline with a suitable acetylating agent, e.g. acetyl chloride in the presence of pyridine, the 4-N-acetyl-N-(2 - N,N - dimethylaminoethyl) - amino - 2 - phenyl - 5,6,7,8-tetrahydro-quinazoline is formed.

In the resulting 2 - R - 4-N-acyl-N-(N,N-disubstituted amino-lower alkyl)-amino-5,6-lower alkylene-pyrimidine compound, the oxo group in the carbonyl portion of the acyl substituent may be replaced by two hydrogens according to the previously-described procedure. Thus, the above 4 - N - acetyl - N - (N,N - dimethylaminoethyl) - amino - 2 - phenyl - 5,6,7,8 - tetrahydro-quinazoline may be converted into 4 - N - ethyl - N - (2 - N,N - dimethylaminoethyl) - amino - 2 - phenyl - 5,6,7,8 - tetrahydro-quinazoline by reacting a tetrahydrofuran solution of the former with lithium aluminum hydride.

When reacted with hydrogen peroxide or methyl iodide, the 4 - N - ethyl - N - (2 - N,N - dimethylaminoethyl)-amino - 2 - phenyl - 5,6,7,8 - tetrahydro-quinazoline is converted into its N-oxide or methiodide.

What is claimed is:

1. A pharmaceutical composition consisting essentially of a pharmacologically effective amount of a member selected from the group consisting of a compound having the formula

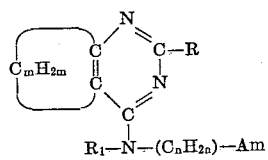

in which Am stands for a member selected from the group consisting of di-lower alkylamino, N-cycloalkyl-N-lower alkylamino and N-cycloalkyl-lower alkyl-N-lower alkylamino in which cycloalkyl has from 5 to 7 carbon atoms, N-phenyl-lower alkyl-N-lower alkylamino, di-hydroxy-lower alkylamino, alkyleneimino with 4 to 8 carbon atoms, azaalkyleneimino and N-lower alkyl-azaalkyleneimino with 4 to 6 carbon atoms and in which the aza-nitrogen is separated from the imino-nitrogen by at least 2 carbon atoms, 4-morpholino and 4-thiamorpholino, —($C_mH_{2m}$)— for alkylene with 2 to 7 carbon atoms separating Am from the nitrogen atom by at least 2 carbon atoms, $R_1$ for a member selected from the group consisting of hydrogen, lower alkyl, phenyl-lower alkyl and lower alkanoyl, R for a member selected from the group consisting of hydrogen, lower alkyl, phenyl, (lower alkyl)-phenyl, (lower alkoxy)-phenyl, (halogeno)-phenyl, pyridyl, thienyl, furyl and phenyl-lower alkyl and —($C_mH_{2m}$)— for lower alkylene having from 3 to 5 carbon atoms, its lower alkyl quaternary, phenyl-lower alkyl quaternary and nontoxic acid addition salt, together with a pharmaceutical excipient.

2. A member selected from the group consisting of a compound of the formula

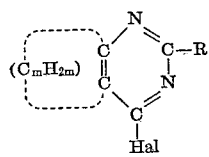

in which R is a member selected from the group consisting of hydrogen, lower alkyl, phenyl, (lower alkyl)-phenyl, (lower alkoxy)-phenyl, (halogeno)-phenyl, pyridyl, thienyl, furyl and phenyl-lower alkyl, Hal is halogeno having an atomic weight greater than 19 and —($C_mH_{2m}$)— for lower alkylene having from 3 to 5 carbon atoms and an acid addition salt thereof.

3. A member selected from the group consisting of a compound of the formula

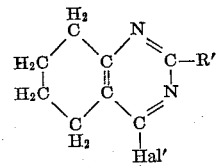

in which R' is a member selected from the group consisting of hydrogen, lower alkyl, phenyl, (lower alkyl)-phenyl, (lower alkoxy)-phenyl and (halogeno)-phenyl, and Hal' is a member selected from the group consisting of chloro and bromo, and an acid addition salt thereof.

4. 4-chloro-5,6,7,8-tetrahydro-quinazoline.

5. 4-chloro-2-phenyl-5,6,7,8-tetrahydro-quinazoline.

6. A member selected from the group consisting of a compound of the formula

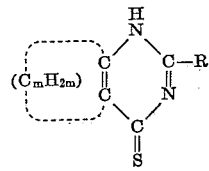

in which R is a member selected from the group consisting of hydrogen, lower alkyl, phenyl, (lower alkyl)-phenyl, (lower alkoxy)-phenyl, (halogeno)-phenyl, pyridyl, thienyl, furyl and phenyl-lower alkyl and —($C_mH_{2m}$)— for lower alkylene having from 3 to 5 carbon atoms.

7. A member selected from the group consisting of a compound of the formula

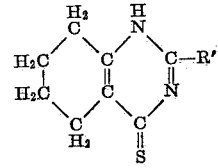

in which R' is a member selected from the group consisting of hydrogen, lower alkyl, phenyl, (lower alkyl)-phenyl, (lower alkoxy)-phenyl and (halogeno)-phenyl.

8. A member selected from the group consisting of 2-phenyl-1,4,5,6,7,8-hexahydro-quinazolin-4-thione.

References Cited

UNITED STATES PATENTS

| | | | |
|---|---|---|---|
| 2,937,118 | 5/1960 | Von Haxthausen et al. | 167—65 |
| 3,063,902 | 11/1962 | Gray et al. | 167—65 |
| 3,127,401 | 3/1964 | Lawes et al. | 260—251 |
| 3,138,592 | 6/1964 | Osdene et al. | 260—247.5 |
| 3,141,019 | 7/1964 | Palazzo et al. | 260—247.5 |
| 3,169,129 | 2/1965 | Rodgers et al. | 260—251 |
| 3,184,462 | 5/1965 | Scarborough et al. | 260—251 |

OTHER REFERENCES

Smith et al., Tetrahedron, vol. 1, pages 38–44 (1957).

NICHOLAS S. RIZZO, *Primary Examiner.*

HENRY R. JILES, *Examiner.*

R. J. GALLAGHER, *Assistant Examiner.*